US010224558B2

(12) United States Patent
Kaneko et al.

(10) Patent No.: US 10,224,558 B2
(45) Date of Patent: Mar. 5, 2019

(54) FUEL CELL SYSTEM AND OPERATION CONTROL METHOD OF THE SAME

(71) Applicant: TOYOTA JIDOSHA KABUSHIKI KAISHA, Toyota-shi, Aichi (JP)

(72) Inventors: Tomohiko Kaneko, Toyota (JP); Yoshiaki Naganuma, Toyota (JP); Yutaka Tano, Toyota (JP); Yohei Okamoto, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 444 days.

(21) Appl. No.: 14/935,012

(22) Filed: Nov. 6, 2015

(65) Prior Publication Data

US 2016/0141667 A1 May 19, 2016

(30) Foreign Application Priority Data

Nov. 14, 2014 (JP) ................................. 2014-231815

(51) Int. Cl.
*H01M 8/00* (2016.01)
*H01M 8/04223* (2016.01)
(Continued)

(52) U.S. Cl.
CPC ..... *H01M 8/04268* (2013.01); *H01M 8/0488* (2013.01); *H01M 8/0491* (2013.01); *H01M 8/0494* (2013.01); *H01M 2008/1095* (2013.01)

(58) Field of Classification Search
CPC .......... H01M 8/04268; H01M 8/0494; H01M 8/0488; H01M 8/0491; H01M 2008/1095
See application file for complete search history.

(56) References Cited

U.S. PATENT DOCUMENTS 8,088,527 B2 * 1/2012 Manabe .................. B60L 1/003
429/432
8,288,043 B2 * 10/2012 Manabe .............. B60L 11/1881
429/428
(Continued)

FOREIGN PATENT DOCUMENTS

JP 2002-313388 A 10/2002
JP 2006-252918 A 9/2006
(Continued)

Primary Examiner — Nicholas P D'Aniello
(74) *Attorney, Agent, or Firm* — Finnegan, Henderson, Farabow, Garrett & Dunner, LLP

(57) ABSTRACT

The present invention enables the determination of an operating point of a fuel cell so as to prioritize the fulfillment of an amount of required power generation while avoiding various limitations, such as a current limit, in a fuel cell system that warms up the fuel cell by a low efficiency operation.

A controller 70 multiplies a voltage command value $V_{com}$ obtained in step S3 by a current command value $I_{com}$ obtained in step S1, then, this is divided by a final voltage command value $V_{fcom}$ obtained in step S4, thereby obtaining a final current command value $I_{fcom}$ to determine an operating point ($I_{fcom}$, $V_{fcom}$) during a warm-up operation (step S5), and then the process ends.

5 Claims, 15 Drawing Sheets

(51) Int. Cl.
*H01M 8/04858* (2016.01)
*H01M 8/04828* (2016.01)
*H01M 8/1018* (2016.01)

(56) References Cited

U.S. PATENT DOCUMENTS

| | | | |
|---|---|---|---|
| 8,460,835 B2 * | 6/2013 | Imanishi | H01M 8/04223 |
| | | | 429/432 |
| 9,240,602 B2 * | 1/2016 | Imanishi | H01M 8/04268 |
| 2005/0181246 A1 | 8/2005 | Nakaji | |
| 2010/0047630 A1 | 2/2010 | Imanishi et al. | |
| 2010/0055521 A1 | 3/2010 | Umayahara et al. | |
| 2010/0273075 A1 | 10/2010 | Imanishi et al. | |
| 2011/0293972 A1 | 12/2011 | Naganuma et al. | |
| 2013/0063072 A1 | 3/2013 | Shirasaka et al. | |

FOREIGN PATENT DOCUMENTS

| | | |
|---|---|---|
| JP | 2008-017598 A | 1/2008 |
| JP | 2008-103250 A | 5/2008 |
| JP | 2008-218398 A | 9/2008 |
| JP | 2009-158399 | 7/2009 |
| JP | 2013-059219 A | 3/2013 |
| KR | 10-2009-0053961 | 5/2009 |
| KR | 10-2012-0006969 | 1/2012 |

* cited by examiner

FUEL CELL SYSTEM AND OPERATION CONTROL METHOD OF THE SAME

CROSS-REFERENCES TO RELATED APPLICATIONS

This application relates to and claims priority from Japanese Patent Application No. JP2014-231815, filed on Nov. 14, 2014, the entire disclosure of which is incorporated herein by reference.

BACKGROUND

Field of the Invention

The present invention relates to a fuel cell system that warms up a fuel cell by a low efficiency operation and to an operation control method of the same.

Description of Related Art

A fuel cell is a power generation system that directly converts energy released as a result of an oxidation reaction for oxidizing fuel through an electrochemical process into electric energy and such fuel cell has a stack structure in which a plurality of membrane-electrode assemblies (cells) is stacked, each membrane-electrode assembly including: an electrolyte membrane for selectively transporting hydrogen ions; and a pair of electrodes made of porous materials which sandwiches the electrolyte membrane on both surfaces thereof.

In fuel cells, 70° C. to 80° C. is generally considered to be the optimal temperature range for generating electric power. However, since cold region environments may require a long time until the fuel cell reaches the optimal temperature range after it has been started, various warm-up systems are being considered. For example, JP2002-313388 A discloses a method of warming up a fuel cell while controlling the amount of self-heating of the fuel cell mounted in a vehicle and running the vehicle through a low-efficiency operation that has lower power generation efficiency compared to a normal operation. This method sets an output voltage of the fuel cell to a voltage value that is lower than the voltage value based on its current and voltage characteristic (hereinafter referred to as "IV characteristic") and increases the heat loss of the fuel cell so as to perform a warm-up operation through self-heating. Therefore, there is no need to install a warm-up apparatus and this method is advantageous.

FIG. 9 is a conceptual diagram showing a change in operating point during a warm-up operation in a conventional fuel cell system. FIG. 9 shows an IV characteristic line $L_{a1}$ of a fuel cell, an operating voltage line $L_{a2}$ of a fuel cell, an equal electric power line (hereinafter referred to as an "equal power line") $L_{a3}$ of a fuel cell and an equal heat generation line (hereinafter referred to as an "equal Q line") $L_4$ of a fuel cell.

As shown in FIG. 9, if the current is limited for some reason (for example, a current limit due to a decrease in voltage of a cell that constitutes the fuel cell; see current limit line $L_{a5}$ shown by a dashed line in FIG. 9) in a state of a warm-up operation at an intersection point where the equal power line $L_{a3}$ and the equal Q line $L_{a4}$ of the fuel cell intersect, i.e. an operating point A ($I_1$, $V_1$) based on an amount of required power generation $P_{req}$ and an amount of required heat generation $Q_{req}$, the operating point of the fuel cell moves on the operating voltage line $L_{a2}$ to shift from the operating point A ($I_1$, $V_1$) to an operating point B ($I_2$, $V_2$). In such way, conventionally, when the current was limited during a warm-up operation of a fuel cell, such current limit was avoided by shifting the operating point of the fuel cell on the operating voltage line $L_2$ that has been set (in other words, shifting the operating point such that the operating voltage is set to a specific value). Therefore, in the end, the amount of required power generation $P_{req}$ of the fuel cell cannot be fulfilled (namely, a state where there is no operating point of the fuel cell on the equal power line $L_3$) and only an amount of power generation $P_{mes}$ which is smaller than the amount of required power generation $P_{req}$ can be generated, thereby causing an issue of a decrease in power responsiveness of the fuel cell system and a decrease in dynamic performance.

SUMMARY

The present invention has been made in light of the above circumstances and an object of the present invention is to provide a technique that can operate a fuel cell so as to prioritize the fulfillment of the amount of required power generation while avoiding various limitations, such as a current limit, in a fuel cell system that warms up the fuel cell by a low efficiency operation.

In order to solve the problems described above, an aspect of the present invention provides an operation control method of a fuel cell system that warms up a fuel cell by a low efficiency operation, the method comprising: a zeroth step of determining a current target value from an amount of required power generation and an amount of required heat generation; a first step of setting the current target value as a current command value such that the current target value falls within a range of an upper limit current and a lower limit current when the current target value falls outside the range of the upper limit current and the lower limit current; a second step of obtaining a target voltage value corresponding to the current command value by dividing the amount of required power generation by the current command value and setting the target voltage value as a voltage command value such that the target voltage value falls within a range of an upper limit voltage when the target voltage value exceeds the upper limit voltage; a third step of setting the voltage command value as a final voltage command value such that the voltage command value falls within a predetermined range that is set for a voltage measured value of the fuel cell when the voltage command value falls outside the predetermined range; a fourth step of obtaining a final current command value by dividing a value obtained as a result of multiplying the voltage command value by the current command value, by the final voltage command value; and a fifth step of operating the fuel cell by the final current command value and the final voltage command value.

According to the above configuration, it is preferable for at least one minimum value among the following (A) to (E) to be set as the upper limit current:

(A) a current value limited by a decrease in cell voltage of the fuel cell;

(B) a current value limited by the fuel cell and auxiliary apparatuses;

(C) a current value limited by a maximum voltage increasing ratio of a voltage converter that controls a voltage of the fuel cell;

(D) a current value limited so as to suppress a rise in exhaust hydrogen concentration due to a pumping hydrogen of the fuel cell; and (E) a current value limited by a permissible amount of power of an entire system.

According to the above configuration, it is preferable for at least one maximum value among the following (F) to (H) to be set as the lower limit current:

(F) a current value obtained by dividing the amount of required power generation by a high potential avoidance voltage;

(G) a current value obtained based on a performance curve of the fuel cell in accordance with the amount of required power generation; and (H) a current value obtained by dividing the amount of required power generation by a heat generation efficiency maintaining voltage.

Furthermore, according to the above configuration, the smaller of the voltage value obtained based on the performance curve of the fuel cell in accordance with the current command value or the heat generation efficiency maintaining voltage may be set as the upper limit voltage.

A fuel cell system according to another embodiment of the present invention is a fuel cell system that warms-up a fuel cell by a low efficiency operation, the system comprising: a determination part that determines a current target value from an amount of required power generation and an amount of required heat generation; a first setting part that sets the current target value as a current command value such that the current target value falls within a range of an upper limit current and a lower limit current when the current target value falls outside the range of the upper limit current and the lower limit current; a second setting part that obtains a target voltage value corresponding to the current command value by dividing the amount of required power generation by the current command value and setting the target voltage value as a voltage command value such that the target voltage value falls within a range of an upper limit voltage when the target voltage value exceeds the upper limit voltage; a third setting part that sets the voltage command value as a final voltage command value such that the voltage command value falls within a predetermined range that is set for a voltage measured value of the fuel cell when the voltage command value falls outside the predetermined range; a derivation part that obtains a final current command value by dividing a value obtained as a result of multiplying the voltage command value by the current command value, by the final voltage command value; and a control part that operates the fuel cell by the final current command value and the final voltage command value.

DETAILED DESCRIPTION OF PREFERRED EMBODIMENTS

An embodiment of the present invention will be described below with reference to the attached drawings.

A. Present Embodiment

A-1. Configuration

Figure 1:
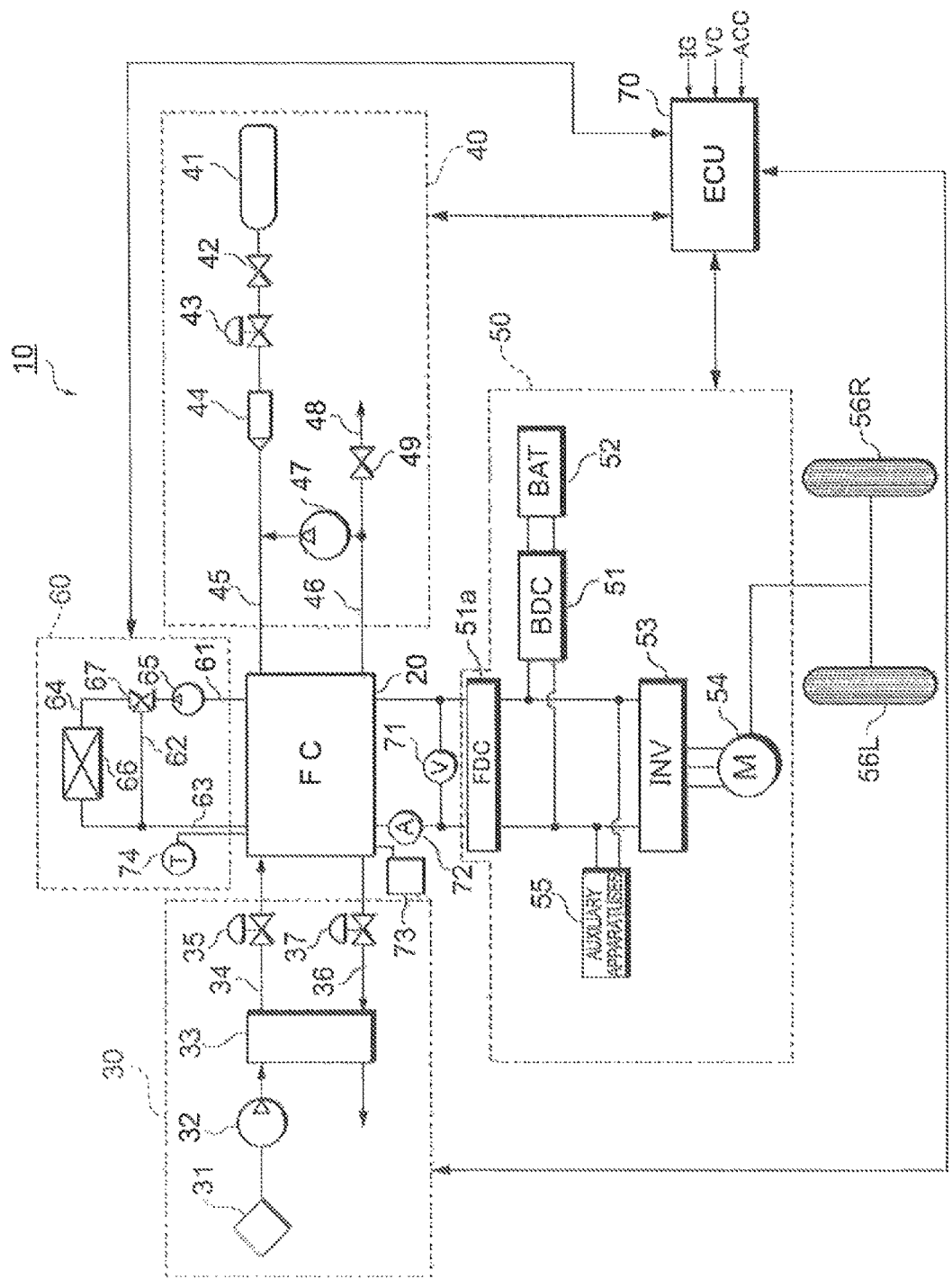
FIG. 1 is a view showing a general configuration of a fuel cell system according to an embodiment.

FIG. 1 shows a general configuration of a vehicle equipped with a fuel cell system 10 according to an embodiment. Although the following description assumes a fuel cell hybrid vehicle (FCHV) as one example of a vehicle, the fuel cell system may also be applied to various types of movable bodies (e.g., ships, airplanes and robots) other than vehicles and stationary power sources, as well as being applied to portable fuel cell systems.

A fuel cell system 10 is capable of switching an operation status between a normal operation and a low efficiency operation having lower power generation efficiency than that in the normal operation (to be described later in more detail) and the fuel cell system 10 functions as an in-vehicle power supply system that is to be installed in a fuel cell hybrid vehicle. The fuel cell system 10 includes a fuel cell stack 20 that generates electric power with supplied reactant gasses (a fuel gas and an oxidant gas), an oxidant gas supply system 30 for supplying the air as an oxidant gas to the fuel cell stack 20, a fuel gas supply system 40 for supplying hydrogen gas as a fuel gas to the fuel cell stack 20, an electric power system 50 for controlling charging and discharging of electric power, a cooling system 60 for cooling the fuel cell stack 20 and a controller (ECU) 70 for controlling the entire system.

The fuel cell stack 20 is a polymer electrolyte fuel cell stack in which a plurality of cells is stacked in series. In the fuel cell stack 20, an oxidation reaction represented by formula (1) below occurs at an anode electrode and a reduction reaction represented by formula (2) occurs at a cathode electrode. An electrogenic reaction represented by formula (3) occurs in the fuel cell stack 20 as a whole.

$$H_2 \rightarrow 2H^+ + 2e^- \quad (1)$$

$$(\tfrac{1}{2})O_2 + 2H^+ + 2e^- \rightarrow H_2O \quad (2)$$

$$H_2 + (\tfrac{1}{2})O_2 \rightarrow H_2O \quad (3)$$

A voltage sensor 71 for detecting an output voltage of the fuel cell stack 20, a current sensor 72 for detecting a power generation current and a cell voltage sensor 73 for detecting a cell voltage are attached to the fuel cell stack 20.

The oxidant gas supply system 30 includes: an oxidant gas passage 34 through which an oxidant gas supplied to the cathode electrode of the fuel cell stack 20 flows; and an oxidant off-gas passage 36 through which an oxidant off-gas discharged from the fuel cell stack 20 flows. The oxidant gas passage 34 is provided with an air compressor 32 for introducing an oxidant gas from the atmosphere via a filter 31, a humidifier 33 for humidifying the oxidant gas to be supplied to the cathode electrode of the fuel cell stack 20, and a throttle valve 35 for adjusting the supply of the oxidant gas. The oxidant off-gas passage 36 is provided with: a backpressure regulating valve 37 for regulating the supply pressure of the oxidant gas; and the humidifier 33 for exchanging moisture between the oxidant gas (dry gas) and the oxidant off-gas (wet gas).

The fuel gas supply system 40 includes: a fuel gas supply 41, a fuel gas passage 45 through which the fuel gas supplied from the fuel gas supply 41 to the anode electrode of the fuel cell stack 20 flows; a circulation passage 46 for circulating a fuel off-gas discharged from the fuel cell stack 20 so as to return to the fuel gas passage 45; a circulation pump 47 that pumps the fuel off-gas in the circulation passage 46 toward the fuel gas passage 45; and an exhaust/drain passage 48 that branches from the circulation passage 46.

The fuel gas supply 41 is constituted by, for example, a high-pressure hydrogen tank, a hydrogen absorbing alloy, etc., and stores a hydrogen gas at a high pressure (e.g., 35 MPa to 70 MPa). When opening a cutoff valve 42, the fuel gas flows from the fuel gas supply 41 toward the fuel gas passage 45. The pressure of the fuel gas is reduced to, for example, about 200 kPa by a regulator 43 and an injector 44, and then the fuel gas is supplied to the fuel cell stack 20.

The fuel gas supply 41 may be constituted by: a reformer that generates a hydrogen-rich reformed gas from a hydrocarbon-based fuel; and a high pressure gas tank that accumulates the reformed gas which has been generated in the reformer after bringing it into a high-pressure state.

The regulator 43 is a device for regulating a pressure (primary pressure) on the upstream thereof into a preset secondary pressure and such regulator 43 is constituted by, for example, a mechanical pressure reducing valve for reducing the primary pressure. The mechanical pressure reducing valve has a casing in which a backpressure chamber and a pressure regulating chamber are formed with a diaphragm therebetween and has a configuration of reducing the primary pressure into a predetermined secondary pressure within the pressure regulating chamber by using the backpressure in the backpressure chamber.

The injector 44 is an electromagnetically-driven on-off valve capable of regulating a gas flow rate and a gas pressure by directly driving a valve body apart from a valve seat at predetermined intervals using an electromagnetic driving force. The injector 44 includes: the valve seat having an injection hole for injecting a gaseous fuel such as the fuel gas; a nozzle body that supplies and guides the gaseous fuel toward the injection hole; and the valve body that is movably accommodated and held in the nozzle body so as to be movable axially (in a direction of gas flow) relative to the nozzle body for opening and closing the injection hole.

The exhaust/drain passage 48 is provided with an exhaust/drain valve 49. The exhaust/drain valve 49 is actuated in response to a command from a controller 70 to discharge the fuel off-gas that contains impurities, as well as water, in the circulation passage 46 to the outside. By opening the exhaust/drain valve 49, the concentration of the impurities in the fuel off-gas in the circulation passage 46 is reduced so that the concentration of hydrogen in the fuel off-gas circulating in the circulation system can be increased.

The fuel off-gas discharged through the exhaust/drain valve 49 is mixed with the oxidant off-gas flowing in the oxidant off-gas passage 36 and diluted by a diluter (not shown). The circulation pump 47 is motor-driven so as to circulate the fuel off-gas in the circulation system and supply it to the fuel cell stack 20.

The electric power system 50 includes a fuel cell stack-dedicated converter (FDC) 51a, a battery-dedicated converter (BDC) 51b, a battery 52, a traction inverter 53, a traction motor 54 and auxiliary apparatuses 55. The FDC 51a functions to control an output voltage of the fuel cell stack 20 and the FDC 51a is a bidirectional voltage converter that converts (by increasing or decreasing) an output voltage that has been input to its primary side (input side: the side of the fuel cell stack 20) into a voltage value different from the primary side and outputs the resulting voltage to a secondary side (output side: the side of the inverter 53) or inversely converts the voltage that has been input to the secondary side into a voltage different from the secondary side and outputs the resulting voltage to the primary side. As a result of the voltage conversion control performed by the FDC 51a, the operating point (I, V) of the fuel cell stack 20 is controlled.

The BDC 51b functions to control an input voltage of the inverter 53 and has a circuit configuration that is, for example, similar to that of the FDC 51a. It should be noted that the above description is not intended to limit the circuit configuration of the BDC 51b, and the BDC 51b may employ any configuration that is capable of controlling the input voltage of the inverter 53.

The battery 52 functions as a storage source for excess electric power, as a storage source for regenerative energy to be used for regenerative braking, and as an energy buffer for load variations involved in acceleration or deceleration of a fuel cell hybrid vehicle. The battery 52 may preferably employ a secondary battery, such as a nickel-cadmium battery, a nickel-hydrogen battery and a lithium secondary battery.

The traction inverter 53 may be, for example, a PWM inverter driven by pulse width modulation, and the traction inverter 53 converts a direct-current voltage output from the fuel cell stack 20 or the battery 52 to a three-phase alternating current voltage in accordance with a control command provided by the controller 70 and controls a rotation torque of the traction motor 54. The traction motor 54 is a motor (e.g., a three-phase alternating current motor) for driving wheels 56L and 56R and constitutes a power source of the fuel cell hybrid vehicle.

The auxiliary apparatuses 55 collectively refer to motors provided in respective parts of the fuel cell system 10 (e.g., power sources for the pumps), inverters for driving these motors, various types of in-vehicle auxiliary apparatuses (e.g., an air compressor, injector, cooling-water circulation pump, radiator, etc.).

The cooling system 60 includes coolant passages 61, 62, 63, 64 in which a coolant circulating inside the fuel cell stack 20 flows, a circulation pump 65 for pumping the coolant, a radiator 66 for exchanging heat between the coolant and the outside air, a three-way valve 67 for switching between circulation paths of the coolant, and a temperature sensor 74 for detecting the temperature of the fuel cell stack 20. The three-way valve 67 is controlled so as to be opened or closed so that, when the normal operation starts after the completion of the warm-up operation, the coolant flowing out of the fuel cell stack 20 flows through the coolant passages 61, 64 so as to be cooled by the radiator 66, then flows through the coolant passage 63 and flows again into the fuel cell stack 20. On the other hand, at the time of the warm-up operation immediately after the start-up of the system, the three-way valve 67 is controlled so as to be opened or closed so that the coolant flowing out of the fuel cell stack 20 flows through the coolant passages 61, 62 63 and flows again into the fuel cell stack 20.

The controller 70 is a computer system which includes a CPU, an ROM, an RAM, input/output interfaces and so on and the controller 70 functions as control means for controlling components (the oxidant gas supply system 30, fuel gas supply system 40, electric power system 50 and cooling system 60) of the fuel cell system 10. For example, when receiving a start signal IG output from an ignition switch, the controller 70 starts the operation of the fuel cell system 10 and obtains required electric power for the entire system based on an accelerator pedal position signal ACC output from an acceleration sensor and a vehicle speed signal VC output from a vehicle speed sensor.

The required electric power for the entire system is the sum of the amount of electric power for the vehicle travel and the amount of electric power for the auxiliary apparatuses. The electric power for the auxiliary apparatuses includes electric power consumed by the in-vehicle auxiliary apparatuses (e.g. a humidifier, air compressor, hydrogen pump, cooling-water circulation pump, etc.), electric power consumed by apparatuses which are required for the vehicle travel (e.g. a transmission, wheel control apparatus, steering apparatus, suspension, etc.), electric power consumed by apparatuses provided inside a passenger compartment (e.g. an air conditioner, lighting equipment, audio system, etc.), and so on.

The controller 70 determines the distribution ratio of the electrical power output from the fuel cell stack 20 and the electric power output from the battery 52, computes a power generation command value and controls the oxidant gas supply system 30 and the fuel gas supply system 40 so that the amount of power generation of the fuel cell stack 20 fulfills an amount of required power generation $P_{req}$. The controller 70 also controls the FDC 51a, etc. to thereby control the operating point of the fuel cell stack 20. The controller 70 outputs an alternating-current voltage command value for each of a U-phase, V-phase and W-phase, as switching commands, to the traction inverter 53 so as to control the output torque and the number of revolutions of the traction motor 54, so that a target vehicle speed according to the accelerator pedal position can be obtained. An overview will be given below regarding the process for determining an operating point of a fuel cell stack 20 during a warm-up operation, which is one feature of the present embodiment.

A-2. Operation

<Overview of Process for Determining an Operating Point During a Warm-Up Operation>

Figure 2:
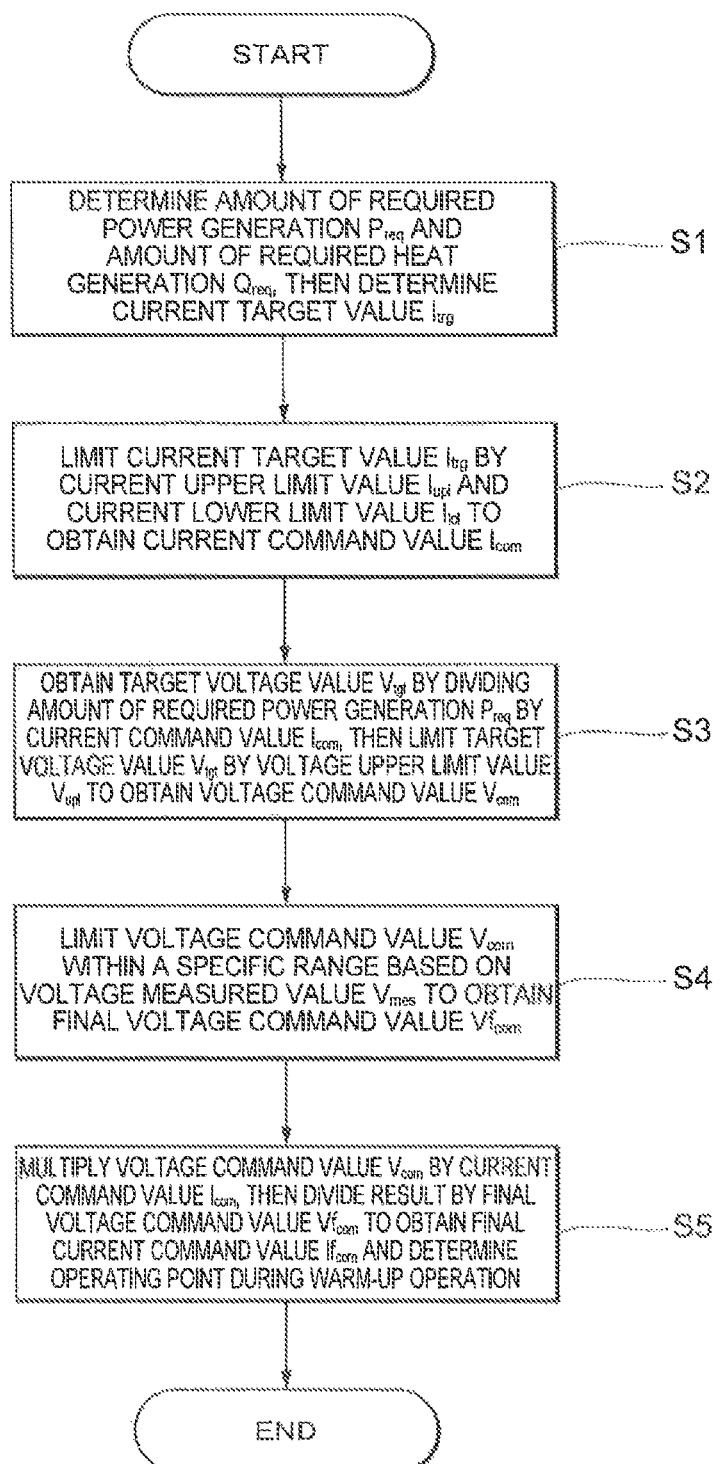
FIG. 2 is a flowchart showing a determination process of an operating point during a warm-up operation.
Figure 3:
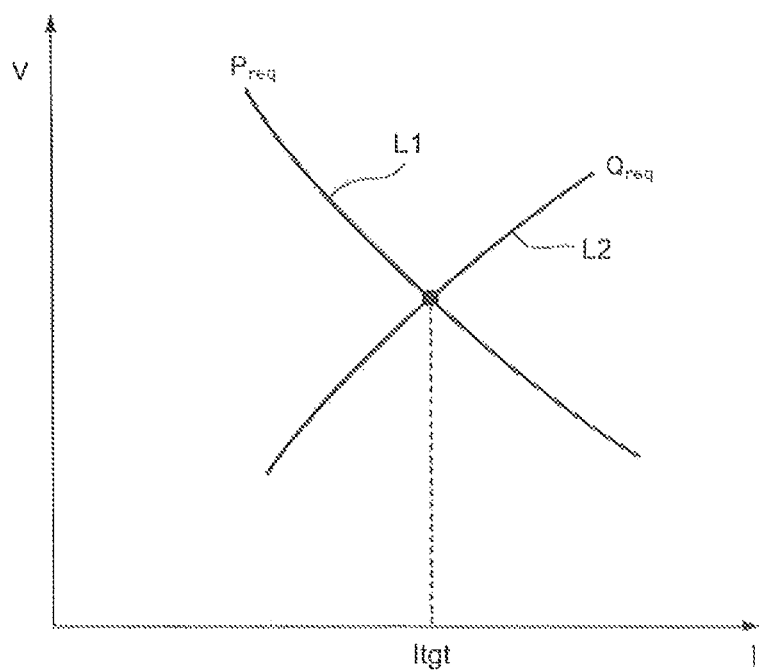
FIG. 3 is a conceptual diagram showing a change in operating point during a warm-up operation in a fuel cell system.

FIG. 2 is a flowchart showing a process for determining an operating point during a warm-up operation performed by a controller 70. FIGS. 3 to 6 are conceptual diagrams showing a change in operation point during a warm-up operation in a fuel cell system. In FIG. 3, L1 represents an equal power line of a fuel cell, and L2 represents an equal Q line of a fuel cell.

The controller (determination part) 70 determines an amount of required power generation $P_{req}$ (equal power line L1) and an amount of required heat generation $Q_{req}$ (equal Q line L2) shown in FIG. 3, and then, based on the determined amount of required power generation $P_{req}$ and the determined amount of required heat generation $Q_{req}$, determines a current target value $I_{tgt}$ of a fuel cell stack 20 (step S1). Referring to the details on determination methods of the amount of required heat generation $Q_{req}$ and the amount of required power generation $P_{req}$, the controller 70 determines the amount of required heat generation $Q_{req}$ based on a sensor signal representing the temperature of the fuel cell stack 20 output from the temperature sensor 74 and an accelerator opening degree signal ACC output from the acceleration sensor. However, with regard to a warm-up operation when the vehicle equipped with the fuel cell system 10 is stopped, the amount of required heat generation $Q_{req}$ for stoppage, which is stored in the memory, etc., is used.

On the other hand, regarding the amount of required power generation $P_{req}$, the controller 70 sets a lower limit threshold (lower limit guard) for the amount of required power generation $P_{req}$ by a minimum amount of power generation $P_{min}$ (for example, 10 kW) determined according to the vehicle speed. The controller 70 calculates the vehicle speed based on a vehicle speed signal VC output from a vehicle speed sensor and determines the minimum amount of power generation $P_{min}$. For a warm-up operation at startup, the controller 70 sets the smaller of the permissible amount of power of the entire fuel cell system 10 (i.e., power that can be accepted by the entire system) or the below-freezing maximum power (i.e., power that is determined according to a dynamic power control of a compressor) as the permissible amount of power generation $P_{per}$ and sets an upper limit threshold (upper limit guard) for the amount of required power generation $P_{req}$. The below freezing maximum power is determined by the controller 70 from the temperature of the fuel cell stack 20 immediately after a start and the present temperature of the fuel cell stack 20, which are detected by the temperature sensor 74.

Figure 4A:
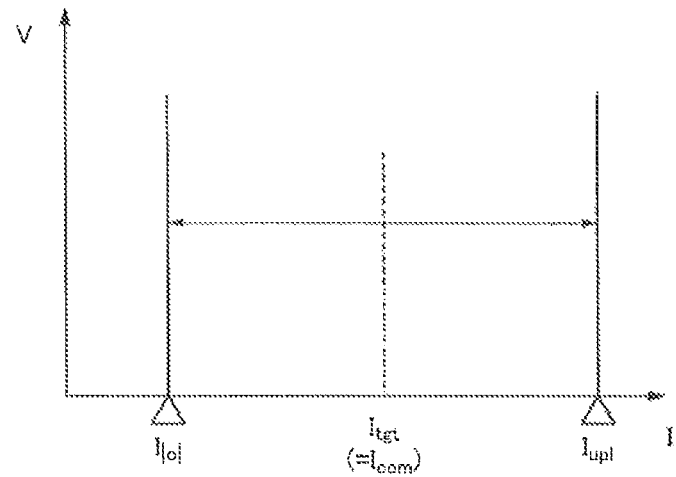
FIG. 4A is a conceptual diagram showing a change in operating point during a warm-up operation in a fuel cell system.
Figure 4B:
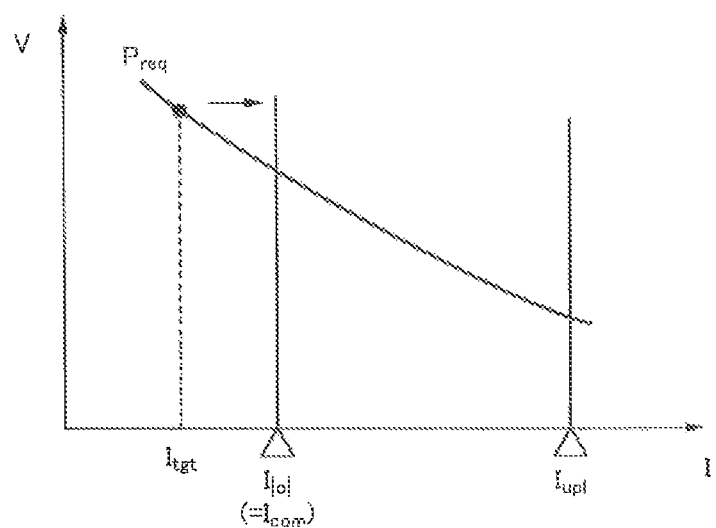
FIG. 4B is a conceptual diagram showing a change in operating point during a warm-up operation in a fuel cell system.
Figure 4C:
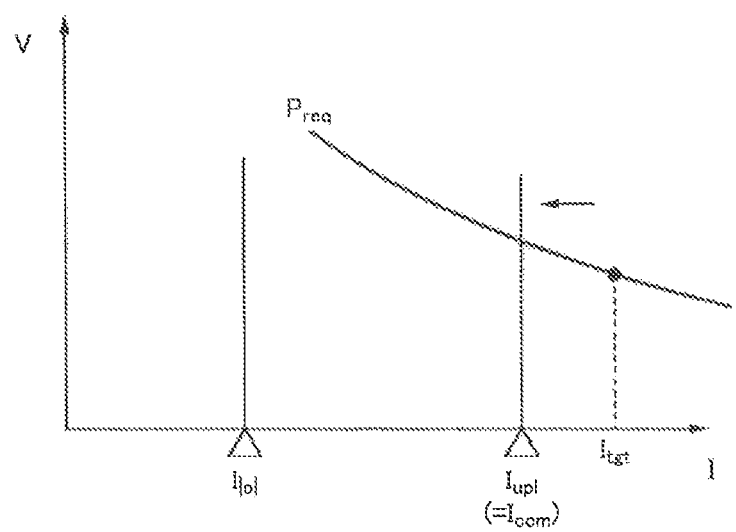
FIG. 4C is a conceptual diagram showing a change in operating point during a warm-up operation in a fuel cell system.

When the process proceeds to step S2, the controller (first setting part) 70 limits the current target value $I_{tgt}$ by a current upper limit threshold $I_{upl}$ and a current lower limit threshold $I_{lol}$ so as to obtain a current command value $I_{com}$ (see FIGS. 4A to 4C). Determination methods of the current upper limit threshold $I_{upl}$ and the current lower limit threshold $I_{lol}$ will be described in detail later and will thus be omitted here. As shown in FIG. 4A, for example, if the current target value $I_{tgt}$ is within the range of the current upper limit threshold $I_{upl}$ and the current lower limit threshold $I_{lol}$ (i.e., if it is within the limits of both the current upper limit threshold $I_{upl}$ and the current lower limit threshold $I_{lol}$), the controller 70 sets the current target value $I_{tgt}$ as a current command value $I_{com}$. On the other hand, if the current target value $I_{tgt}$ falls below the current lower limit threshold $I_{lol}$, the controller 70 sets the current lower limit threshold $I_{lol}$ as the current command value $I_{com}$ (see FIG. 4B). Similarly, if the current target value $I_{tgt}$ exceeds the current upper limit threshold $I_{upl}$, the controller 70 sets the current upper limit threshold $I_{upl}$ as the current command value $I_{com}$ (see FIG. 4c).

Figure 5A:
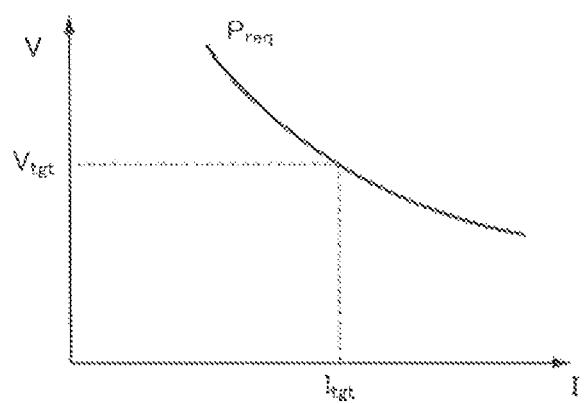
FIG. 5A is a conceptual diagram showing a change in operating point during a warm-up operation in a fuel cell system.
Figure 5B:
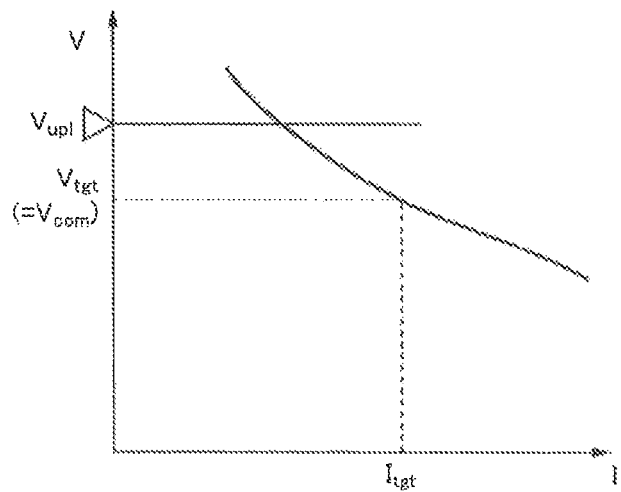
FIG. 5B is a conceptual diagram showing a change in operating point during a warm-up operation in a fuel cell system.
Figure 5C:
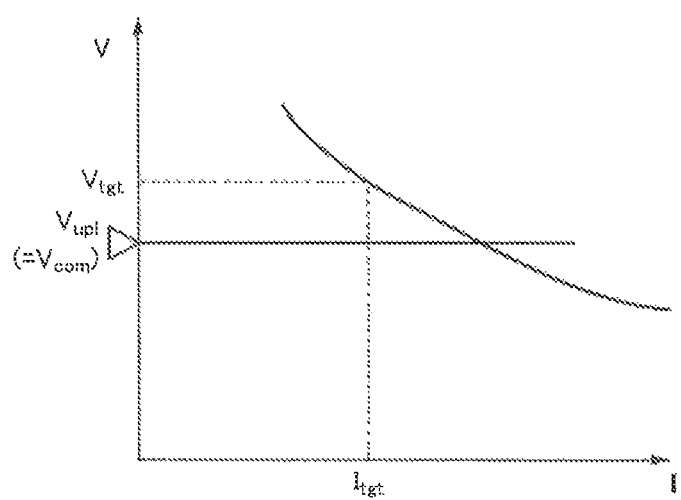
FIG. 5C is a conceptual diagram showing a change in operating point during a warm-up operation in a fuel cell system.

Next, the controller (second setting part) 70 divides the amount of required power generation $P_{req}$ obtained in step S1 by the current command value $I_{com}$ determined in step S2 and thereby obtains a target voltage value $V_{tgt}$. The controller (second setting part) 70 limits the target voltage value $V_{tgt}$ by a voltage upper limit threshold $V_{upl}$ so as to derive a voltage command value $V_{com}$ (step S3; see FIGS. 5A to 5C). The determination method of the voltage upper limit threshold $V_{upl}$ will be described in detail later and will thus be omitted here. As shown in FIG. 5B, for example, if the voltage target value $V_{tgt}$ does not exceed the voltage upper limit threshold $V_{upl}$ (i.e., if it is within the limit of the voltage upper limit threshold $V_{upl}$), the controller 70 sets the voltage target value $V_{tgt}$ as the voltage command value $V_{com}$ (see FIG. 5B). On the other hand, if the voltage target value $V_{tgt}$, exceeds the voltage upper limit threshold $V_{upl}$, the controller 70 sets the voltage upper limit threshold $V_{upl}$ as the voltage command value $V_{com}$ (see FIG. 5C).

Figure 6A:
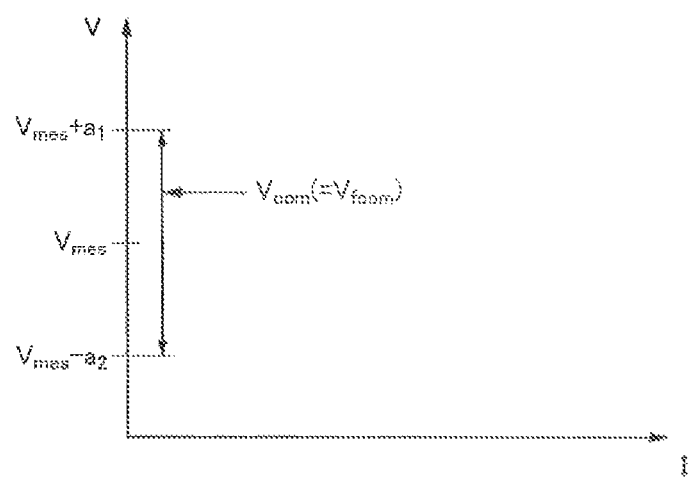
FIG. 6A is a conceptual diagram showing a change in operating point during a warm-up operation in a fuel cell system.
Figure 6B:
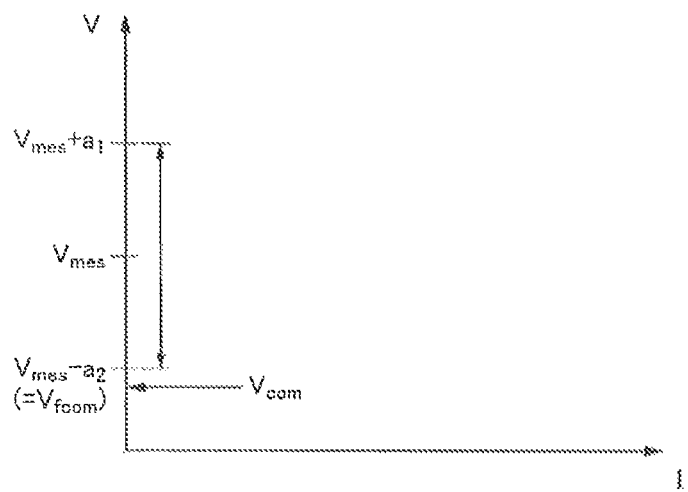
FIG. 6B is a conceptual diagram showing a change in operating point during a warm-up operation in a fuel cell system.
Figure 6C:
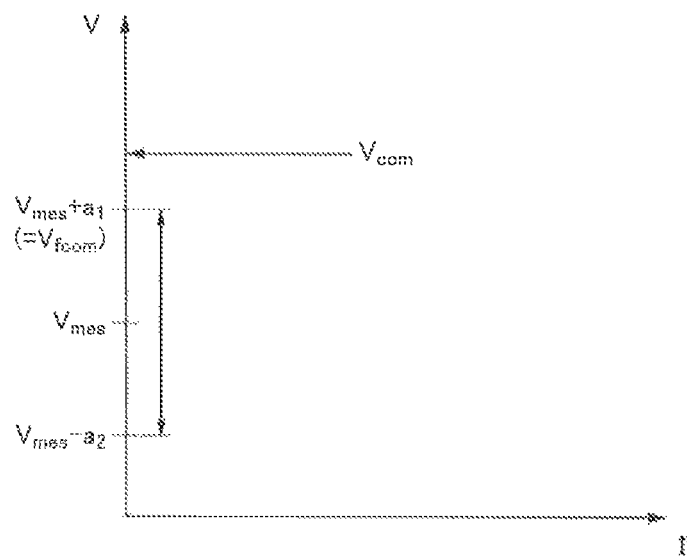
FIG. 6C is a conceptual diagram showing a change in operating point during a warm-up operation in a fuel cell system.

Then, the controller (third setting part) 70 limits the voltage command value $V_{com}$ set in step S3 within a specific range based on a voltage measured value $V_{mes}$ of the fuel cell stack 20 from a voltage sensor 71 so as to derive a final voltage command value $V_{fcom}$ (step S4). For example, as shown in FIG. 6A, if the voltage command value $V_{com}$ is within a specific range of the voltage measured value $V_{mes}$ ($V_{mes}-a1 < V_{com} < V_{mes}+a2$), the controller 70 sets the voltage command value $V_{com}$ as a final voltage command value $V_{fcom}$. On the other hand, if the voltage command value $V_{com}$ falls outside the specific range of the voltage measured value $V_{mes}$ the voltage command value $V_{com}$ is limited such that the final voltage command value $V_{mes}$, falls within the specific range of the voltage measured value $V_{mes}$. More particularly, as shown in FIG. 6B, if the voltage command value $V_{com}$ falls below the lower limit of the voltage measured value $V_{mes}$ ($V_{com} < V_{mes}-a1$), the controller 70 sets the lower limit of the voltage measured value $V_{mes}(V_{mes}-a1)$ as a final voltage command value $V_{fcom}$. On the other hand, as shown in FIG. 6C, if the voltage command value $V_{com}$ exceeds the upper limit of the voltage measured value $V_{mes}(V_{mes}+a2 < V_{com})$, the controller 70 sets the upper limit of the voltage measured value $V_{mes}(V_{mes}+a2)$ as a final voltage command value $V_{fcom}$. In such way, limiting the voltage command value $V_{com}$ within a specific range of the voltage measured value $V_{mes}$ (i.e., actual measured value) is for preventing the voltage command value from deviating from the reality of the situation.

Furthermore, the controller (derivation part) 70 multiplies the voltage command value $V_{com}$ obtained in step S3 by the current command value $I_{com}$ obtained in step S2, then, this is divided by the final voltage command value $V_{fcom}$, obtained in step S4 (see formula (4) below), thereby obtaining a final current command value $I_{fcom}$ to determine the operating point ($I_{fcom}$, $V_{com}$) during a warm-up operation (step S5), and then the process ends. After this process, the controller (control part) 70 operates the fuel cell stack 20 at the determined operating point.

$$V_{com} * I_{com} / V_{fcom} = I_{fcom} \quad (4)$$

As is obvious from formula (4) above, not only the operating point ($I_{com}$, $V_{com}$) but also the final operating point ($I_{fcom}$, $V_{fcom}$) to be determined will exist on the equal power line L3. In other words, even if various limitations exist, such as a current limit, the fuel cell can still be operated (i.e., the operating point of the fuel cell can still be determined) so as to prioritize the fulfillment of the amount of required power generation while avoiding such limits. Therefore, the decrease in power responsiveness of the fuel cell system can be suppressed.

Figure 7:
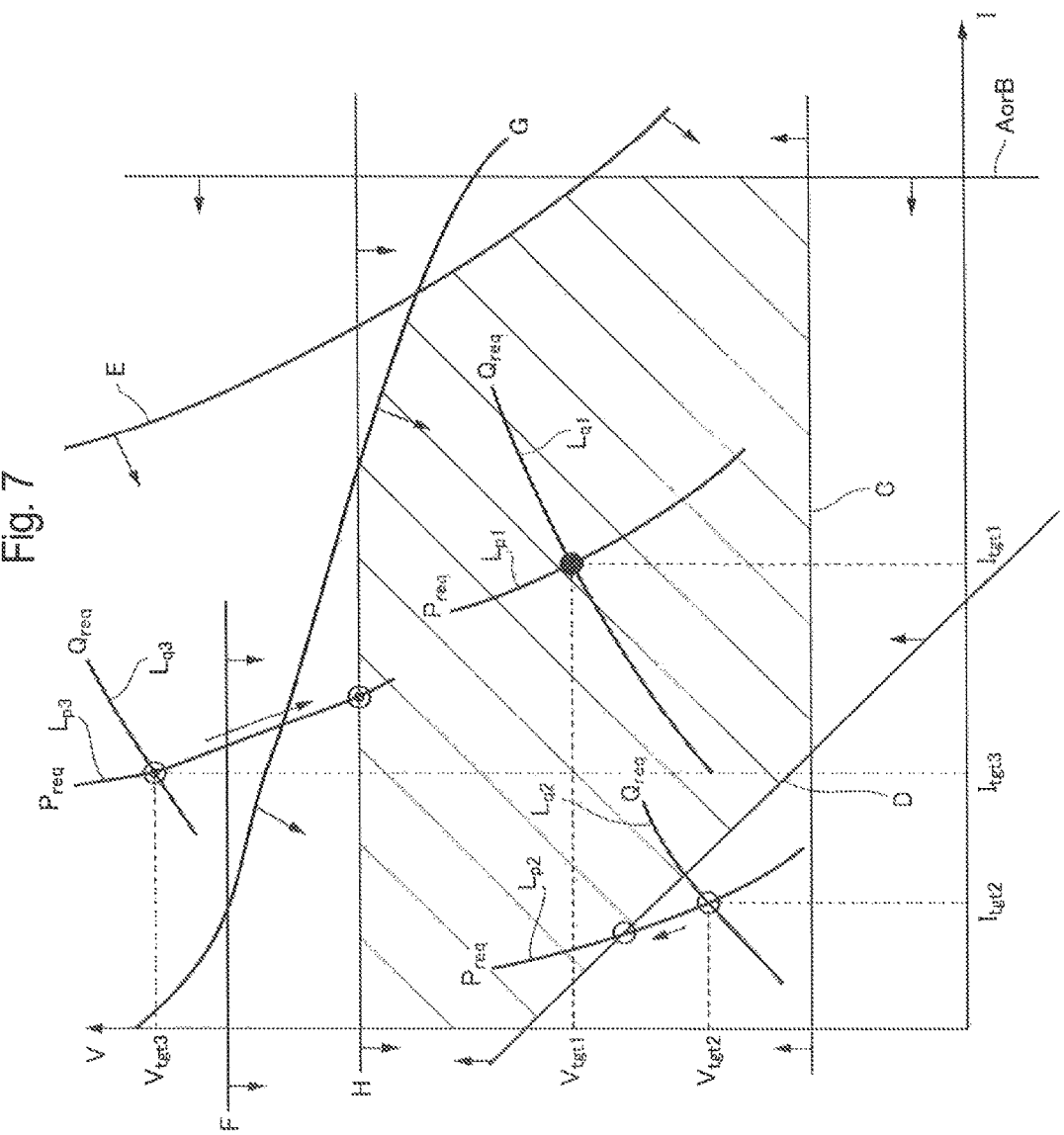
FIG. 7 is a conceptual diagram for describing determination methods of a current upper limit threshold $I_{upl}$, a current lower limit threshold $I_{lol}$ and a voltage upper limit threshold $V_{upl}$.

Next, determination methods of the current upper limit threshold $I_{upl}$, the current lower limit threshold $I_{lol}$ and the voltage upper limit threshold $V_{upl}$ will be described below with reference to FIG. 7, etc. FIG. 7 illustrates the relationship between: the operating point (I, V) of the fuel cell stack 20 obtained from the amount of required power generation $P_{req}$ and the amount of required heat generation $Q_{req}$ at a certain timing; and the current upper limit threshold $I_{upl}$, the current lower limit threshold $I_{lol}$ and the voltage upper limit threshold $V_{upl}$.

<Determination Method of a Current Upper Limit Threshold $I_{upl}$>

With regard to the current upper limit threshold $I_{upl}$, at least one minimum value (one in the present embodiment) among the current limits shown in (A) to (E) below, i.e. the smallest current limit value, is set as the current upper limit threshold 10.

(A) Current value limited by a decrease in cell voltage (first current limit A shown in FIG. 7).

(B) Current value limited by a fuel cell stack 20 and auxiliary apparatuses 55 (second current limit B shown in FIG. 7).

(C) Current value limited by a maximum voltage increasing ratio of an FDC 51a (third current limit C shown in FIG. 7).

(D) Current value limited so as to suppress the rise in exhaust hydrogen concentration due to a pumping hydrogen (fourth current limit D shown in FIG. 7).

(E) Current value limited by a permissible amount of power of the entire fuel cell system 10 (fifth current limit E shown in FIG. 7).

The first current limit A is for protecting components which constitute the fuel cell stack 20, and the second current limit B is for protecting the entire unit of the fuel cell stack 20. Since the voltage increasing magnification of the FDC 51a also has a limit, the third current limit C is set such that it does not exceed such limit. Furthermore, the fourth current limit D is set so as to comply with the laws and regulations regarding exhaust hydrogen concentration, and in particular, it is set in consideration of the rise in exhaust hydrogen concentration due to the pumping hydrogen. The pumping hydrogen here refers to hydrogen that is generated in a cathode during a warm-up operation of the fuel cell stack 20. More specifically, when the supply of oxidant gas to the cathode during a warm-up operation is not sufficient (for example, if the air stoichiometric ratio is less than 1.0), formula (5) below proceeds according to the amount of insufficient oxidant gas, and hydrogen ions and electrons recombine such that the hydrogen is generated.

The generated hydrogen is discharged from the cathode together with the oxygen off-gas. In such way, the hydrogen generated at the cathode through recombination of the dissociated hydrogen ion and electrons, i.e. the anode gas generated at the cathode, is referred to as "pumping hydrogen." Furthermore, the fifth current limit E is set in consideration of the power that can be received by the entire system.

$$\text{Cathode: } 2H^+ + 2e^- \rightarrow H_2 \quad (5)$$

As shown in FIG. 7 with a black circle, if an operating point P1 ($I_{tgl1}$, $V_{tgl2}$) of the fuel cell stack 20 obtained from the amount of required power generation $P_{req}$ (equal power line $L_{p1}$) and the amount of required heat generation $Q_{req}$, (equal Q line $L_{q1}$) is within first current limit A to fifth current limit E (namely, if the operating point falls within the range of first current limit A to fifth current limit E (see hatching portion of FIG. 7)), as has already been described (see step S2 of FIG. 2), the current target value $I_{tgt1}$ is set as the current command value $I_{com}$ without being particularly limited.

On the other hand, as shown in FIG. 7 with white circles, if an operating point P2 ($I_{tgt2}$, $V_{tgt2}$) of the fuel cell stack 20 obtained from the amount of required power generation $P_{req}$ (equal power line $L_{p2}$) and the amount of required heat generation $Q_{req}$ (equal Q line $L_{q2}$) falls under any of first current limit A to fifth current limit E (here, the fourth current limit D), as has already been described (see step S1 of FIG. 2), the current target value $I_{tgt2}$ it is limited by the current upper limit threshold $I_{up1}$ due to the fourth current limit D (in FIG. 7, the current value of the intersection point of the fourth current limit D line and the equal power line $L_{p2}$) and the current upper limit threshold $I_{up1}$ is set as the current command value $I_{com}$.

<Determination Method of a Current Lower Limit Threshold $I_{lo1}$>

With regard to the current lower limit threshold $I_{lo1}$, at least one maximum value (one in the present embodiment) among the current limits shown in (F) to (H) below, i.e. the largest current limit value, is set as the current lower limit threshold $I_{lo1}$.

(F) Current value obtained by dividing the amount of required power generation by a high potential avoidance voltage (sixth current limit F shown in FIG. 7).

(G) Current value obtained based on a performance curve (IV characteristic line) of the fuel cell stack 20 in accordance with the amount of required power generation (seventh current limit G shown in FIG. 7).

(H) Current value obtained by dividing the amount of required power generation by a heat generation efficiency maintaining voltage (eighth current limit H shown in FIG. 7).

The sixth current limit F is a current lower limit for suppressing degradation of the fuel cell stack 20 (such as a catalyst metal), and the seventh current limit G is a current lower limit obtained from an IV characteristic line of the fuel cell stack 20. Furthermore, the eighth current limit H is a current lower limit for maintaining the heat generation efficiency. Here, the heat generation efficiency maintaining voltage is determined from the temperature of the fuel cell stack 20 immediately after a start and the present temperature of the fuel cell stack 20, which are detected by the temperature sensor 74. A map for determining the heat generation efficiency maintaining voltage and a map for setting each current limit are stored in a memory, etc. of the controller 70. These current limits may also be sequentially derived by using various functions instead of (or in addition to) using maps.

Here, as shown in FIG. 7 with a black circle, if an operating point P1 ($I_{tgt1}$, $V_{tgt1}$) of the fuel cell stack 20 obtained from the amount of required power generation $P_{req}$ (equal power line $L_{p1}$) and the amount of required heat generation $Q_{req}$ (equal Q line $L_{q1}$) is within the limits of the sixth current limit F to the eighth current limit H (namely, if the operating point falls within the range of the sixth current limit F to the eighth current limit H (see the hatched portion of FIG. 7)), as has already been described (see step S1 of FIG. 2), the current target value $I_{tgt1}$ is set as the current command value $I_{com}$ without being particularly limited.

On the other hand, as shown in FIG. 7 with white double circles, if an operating point P2 ($I_{tgt3}$, $V_{tgt3}$) of the fuel cell stack 20 obtained from the amount of required power generation $P_{req}$ (equal power line $L_{p3}$) and the amount of required heat generation $Q_{req}$ (equal Q line $L_{q3}$) falls on any of the sixth current limit F to the eighth current limit H (here, all of sixth current limit F to eighth current limit H), as has already been described (see step S1 of FIG. 2), the current target value $I_{gt3}$ is limited by the current lower limit threshold $I_{lo1}$ due to the eighth current limit H (in FIG. 7, the current value of the intersection point of the eighth current limit H line and the equal power line $L_{p3}$) and the current lower limit threshold $I_{lo1}$ is set as the current command value $I_{com}$. Moreover, as described above, with regard to the current lower limit threshold $I_{lo1}$, the largest current limit value among the sixth current limit F to the eighth current limit H is set as the current lower limit threshold $I_{lo1}$, and thus, in the example shown in FIG. 7, the current lower limit threshold $I_{lo1}$ due to the eighth current limit H is set as the current command value $I_{com}$.

According to the circumstances, it is assumed that both the current upper limit threshold $I_{up1}$ due to the first current limit A to the fifth current limit E and the current lower limit threshold $I_{lo1}$ due to the sixth current limit F to the eighth current limit H may take place simultaneously. In such a case, taking into account the large influence that would affect the fuel cell system 10, it is desirable to prioritize the limit by the current upper limit threshold $I_{up1}$. Namely, since the first current limit A that defines the current upper limit threshold $I_{up1}$ is provided for protecting components (such as electrolytes) that constitute the fuel cell stack 20, if such current limit is not complied with, serious damage may occur to the fuel cell stack 20. Therefore, in the present embodiment, the limit by the current upper limit threshold $I_{up1}$ has priority over the current lower limit threshold $I_{lo1}$. However, the priority of the first current limit A to the eighth current limit H may be arbitrarily set or changed by system designers.

<Determination Method of a Voltage Upper Limit Threshold $V_{up1}$>

With regard to the voltage upper limit threshold $V_{up1}$, the smaller of the voltage value of the seventh current limit G (namely, the voltage value obtained based on the performance curve (IV characteristic line) of the fuel cell stack 20 in accordance with the amount of required power generation) or the voltage value of the eighth current limit H (namely, the voltage value of the heat generation efficiency maintaining voltage) is set as the voltage upper limit threshold $V_{up1}$.

Figure 8:
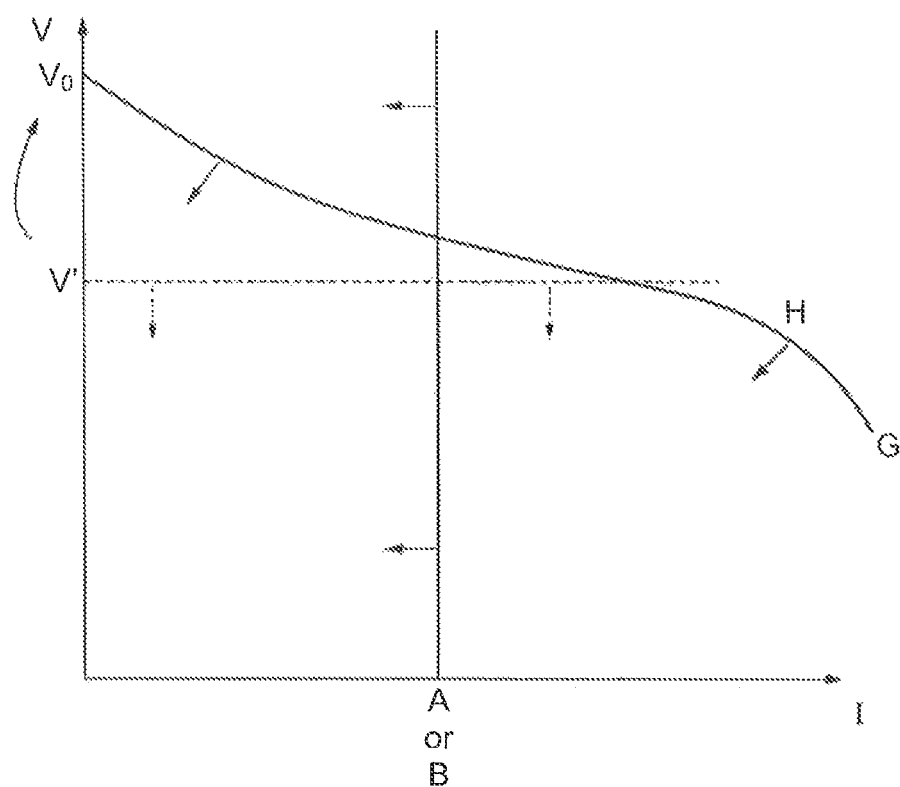
FIG. 8 is a conceptual diagram for describing a determination method of a voltage upper limit threshold $V_{upl}$.
Figure 9:
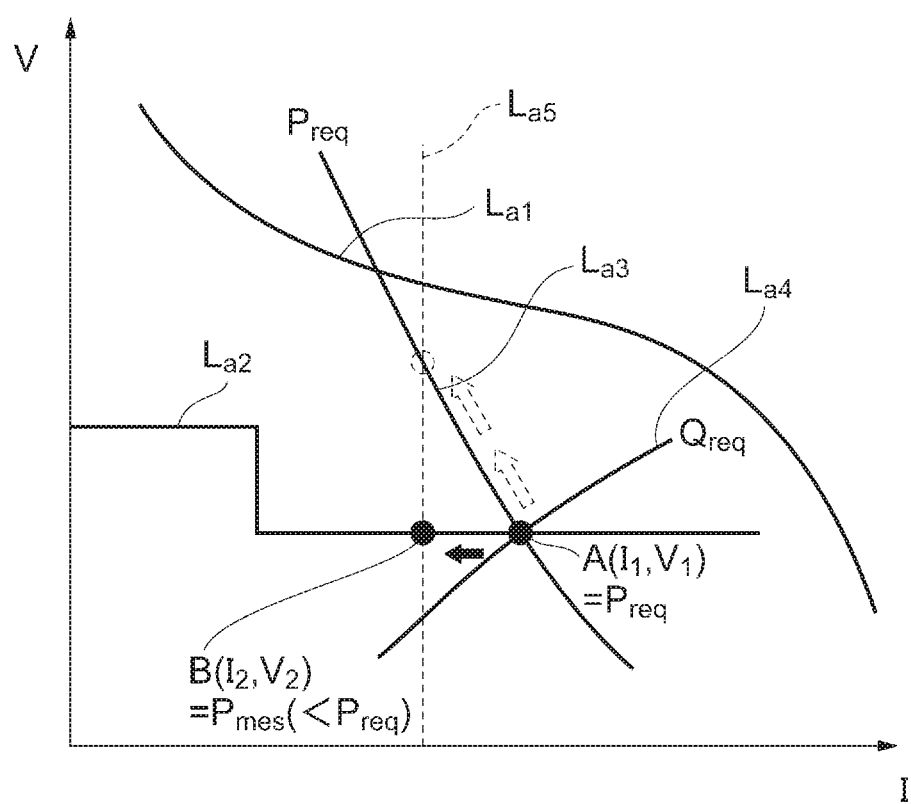
FIG. 9 is a conceptual diagram showing a change in operating point during a warm-up operation in a conventional fuel cell system.

However, as shown in FIG. 8, for example, if the current value of the smaller of the above-described first current limit A or second current limit B is smaller than the current value of the seventh current limit G (namely, the current value obtained based on the performance curve (IV characteristic line) of the fuel cell stack 20), the voltage value V' of the eighth current limit H used for calculating the voltage upper limit threshold $V_{up1}$ (namely, the voltage value of the heat generation efficiency maintaining voltage) is set to an open end voltage V0 of the fuel cell stack 20. The voltage value is set as described above because, if the voltage value V' of the eighth current limit H (namely, the voltage value of the power generation efficiency maintaining voltage) is set without any change in a state where the current value of the smaller of the first current limit A or the second current limit B is smaller than the current value of the seventh current limit G, the fuel cell stack cannot be operated while staying within the current limit (see FIG. 8). In this way, with regard to the voltage value of the heat generation efficiency maintaining voltage used for calculating the voltage upper limit threshold $V_{up1}$, under a condition where specific requirements are met, the voltage value V' of the eighth current limit H may be replaced with the open end voltage V0 of the fuel cell stack 20 instead of using it without any change so as to enable a warm-up operation of the fuel cell system 10 at an operation point that is desirable for the entire system.

As described above, the present invention can operate a fuel cell so as to prioritize the fulfillment of the amount of required power generation while avoiding various limitations, such as a current limit, in a fuel cell system that warms up the fuel cell by a low efficiency operation.

The present invention is suitably applicable to a fuel cell system that warms up a fuel cell by a low efficiency operation.

What is claimed is:

1. An operation control method of a fuel cell system that warms up a fuel cell by a low efficiency operation, the method comprising:
    a first step of determining a current target value from an amount of required power generation and an amount of required heat generation;
    a second step of setting the current target value as a current command value such that the current target value falls within a range of an upper limit current and a lower limit current when the current target value falls outside the range of the upper limit current and the lower limit current;
    a third step of obtaining a target voltage value corresponding to the current command value by dividing the amount of required power generation by the current command value and setting the target voltage value as a voltage command value such that the target voltage value falls within a range of an upper limit voltage when the target voltage value exceeds the upper limit voltage;
    a fourth step of setting the voltage command value as a final voltage command value such that the voltage command value falls within a predetermined range that is set for a voltage measured value of the fuel cell when the voltage command value falls outside the predetermined range;
    a fifth step of obtaining a final current command value by dividing a value obtained as a result of multiplying the voltage command value by the current command value, by the final voltage command value; and
    a sixth step of operating the fuel cell by the final current command value and the final voltage command value.

2. The operation control method according to claim 1, wherein at least one minimum value among the following (A) to (E) is set as the upper limit current:
    (A) a current value limited by a decrease in cell voltage of the fuel cell;
    (B) a current value limited by the fuel cell and auxiliary apparatuses;
    (C) a current value limited by a maximum voltage increasing ratio of a voltage converter that controls a voltage of the fuel cell;
    (D) a current value limited so as to suppress a rise in exhaust hydrogen concentration due to a pumping hydrogen of the fuel cell; and
    (E) a current value limited by a permissible amount of power of an entire system.

3. The operation control method according to claim 2, wherein at least one maximum value among the following (F) to (H) is set as the lower limit current:
    (F) a current value obtained by dividing the amount of required power generation by a high potential avoidance voltage;
    (G) a current value obtained based on a performance curve of the fuel cell in accordance with the amount of required power generation; and
    (H) a current value obtained by dividing the amount of required power generation by a heat generation efficiency maintaining voltage.

4. The operation control method according to claim 3, wherein the smaller of a voltage value obtained based on the performance curve of the fuel cell in accordance with the current command value or the heat generation efficiency maintaining voltage is set as the upper limit voltage.

5. A fuel cell system that warms up a fuel cell by a low efficiency operation, the system comprising a controller programmed to:
    determine a current target value from an amount of required power generation and an amount of required heat generation;
    set the current target value as a current command value such that the current target value falls within a range of an upper limit current and a lower limit current when the current target value falls outside the range of the upper limit current and the lower limit current;
    obtain a target voltage value corresponding to the current command value by dividing the amount of required power generation by the current command value and setting the target voltage value as a voltage command value such that the target voltage value falls within a range of an upper limit voltage when the target voltage value exceeds the upper limit voltage;
    set the voltage command value as a final voltage command value such that the voltage command value falls within a predetermined range that is set for a voltage measured value of the fuel cell when the voltage command value falls outside the predetermined range;
    obtain a final current command value by dividing a value obtained as a result of multiplying the voltage command value by the current command value, by the final voltage command value; and
    operate the fuel cell by the final current command value and the final voltage command value.

* * * * *